United States Patent [19]

Utagawa et al.

[11] Patent Number: 5,029,998
[45] Date of Patent: Jul. 9, 1991

[54] FOCUS STATE DETECTING DEVICE

[75] Inventors: Ken Utagawa; Yosuke Kusaka, both of Yokohama; Shigeyuki Uchiyama, Tokyo; Shozo Yamano, Tokyo; Kenji Ishizuki, Tokyo, all of Japan

[73] Assignee: Nikon Corporation, Tokyo, Japan

[21] Appl. No.: 600,245

[22] Filed: Oct. 23, 1990

Related U.S. Application Data

[63] Continuation of Ser. No. 474,672, Feb. 6, 1990, abandoned, which is a continuation of Ser. No. 287,061, Dec. 21, 1988, abandoned.

[30] Foreign Application Priority Data

Dec. 25, 1987 [JP] Japan ................. 62-328759

[51] Int. Cl.$^5$ .............................................. G03B 13/36
[52] U.S. Cl. ..................................... 354/402; 354/408
[58] Field of Search .............. 354/402, 403, 405, 406, 354/408

[56] References Cited

U.S. PATENT DOCUMENTS

| 4,564,919 | 1/1986 | Utagawa .................. 364/728 |
| 4,768,052 | 8/1988 | Hamada et al. ............ 354/402 |

FOREIGN PATENT DOCUMENTS

| 3803305 | 8/1988 | Fed. Rep. of Germany ...... 354/402 |
| 62-173413 | 1/1986 | Japan . |
| 62-212611 | 3/1986 | Japan . |
| 0095511 | 5/1987 | Japan ..................... 354/402 |
| 2183419 | 6/1987 | United Kingdom ............ 354/402 |

Primary Examiner—Russell E. Adams
Attorney, Agent, or Firm—Shapiro and Shapiro

[57] ABSTRACT

A focus state detecting device for a camera has plural areas for focus state detection for an object, and is capable of securing wide focus state detecting areas.

The device has a pair of first photo-detector arrays arranged in a first direction and a pair of second photo-detector arrays arranged in a second direction, wherein the light receiving area of the first arrays is wider than that of the second arrays, and the first direction is the same as the longitudinal direction of the photographing field.

20 Claims, 10 Drawing Sheets

FOCUS STATE DETECTING DEVICE

This is a continuation of application Ser. No. 474,672 filed Feb. 6, 1990, now abandoned, which is a continuation of application Ser. No. 287,061 filed Dec. 21, 1988, now abandoned.

BACKGROUND OF THE INVENTION

1. Field of the Invention

The present invention relates to a focus state detecting device for use in a camera or the like.

2. Related Background Art

A focus state detecting device having two pairs of photoelectric sensor arrays for detecting displacement in the light image in two directions on a plane perpendicular to the optical axis is already known in the Japanese Laid-open Patent 62-173413. Such known device will be explained in the following with reference to FIG. 1.

A focus state detecting optical system is provided with a viewing field mask 2101 positioned in the vicinity of a focus state detecting plane; a field lens 2102; a diaphragm plate 2103 having two pairs of apertures; and a re-imaging lens 2104, and is composed of an optical system for guiding light fluxes having passed spatially different areas 2103a, 2103b to a pair of photoelectric sensor arrays 2105a, 2105b, and another optical system for guiding the light fluxes having passed spatially different areas 2103c, 2103d, which are different from those mentioned above, to another pair of photoelectric sensor arrays 2105c, 2105d. The first pair of photoelectric sensor arrays 2105a, 2105b is positioned perpendicular to the latter pair of photoelectric sensor arrays 2105c, 2105d.

Though the above-mentioned Japanese Laid-open Patent 62-173413 does not disclose the arrangement of circuits related to the driving of the photoelectric sensor arrays, the related circuits in fact have to be placed on the substrate bearing the photoelectric sensor arrays, so that a space for the circuits has to be provided on the substrate. This fact limits the arrangement of the photoelectric sensor arrays, thus resulting in a drawback of limitation in the light receiving area or focus state detecting area.

The Japanese Laid-open patent 62-212611 discloses, as in the Japanese Laid-open Patent 62-173413, a device for detecting the displacement of the image in two directions on a plane perpendicular to the optical axis of the optical system. The Japanese Laid-open Patent 62-212611 discloses the arrangement of the related circuits on the substrate bearing the photoelectric sensor arrays as shown in FIG. 2, in which the charges accumulated in the arrays PD1, PD4 are transferred through a common shift register CCD1 to an output stage OS1, while those accumulated in the arrays PD2, PD3 are transferred through a common shift register CCD2 to an output stage OS2, and transfer gates G1, G2, G3, G4 are provided to transfer the charges accumulated in the arrays to the neighboring shift registers. The arrays PD1 and PD3 are paired to detect the image displacement in one direction, while the arrays PD2 and PD4 are paired to detect that in another direction. Thus the output of the array PD1 is compared with that of PD3, and the output of the array PD2 is compared with that of PD4. However, since the arrays PD1 and PD3 have different output stages, the output signal levels from the output stages may be different even when the object has uniform luminosity, thus giving rise to a deteriorated precision of detection.

SUMMARY OF THE INVENTION

An object of the present invention is to provide a focus state detecting device having plural areas for focus state detection for an object, and capable of securing wide focus state detecting areas.

Another object of the present invention is to provide a focus state detecting device having plural focus state detecting areas while maintaining a high precision of focus state detection.

The first-mentioned object can be achieved, according to the present invention, by a device having a pair of first array means arranged in a first direction and a pair of second array means arranged in a second direction, wherein the light receiving area of the first array means is selected wider than that of the second array means, and the first direction is the same as the longitudinal direction of the photographing field.

The second-mentioned object can be achieved, according to the present invention, by a device having a pair of first array means arranged in a first direction and a pair of second array means arranged in a second direction, wherein the outputs of at least the pair of first array means are made common.

DESCRIPTION OF THE PREFERRED EMBODIMENTS

In a following there will be explained the principle of the present invention, through the positional relationship of circuits related to the photoelectric sensor arrays in the focus state detecting device disclosed in the Japanese Laid-open Patent 62-173413 shown in FIG. 1.

Figure 1:
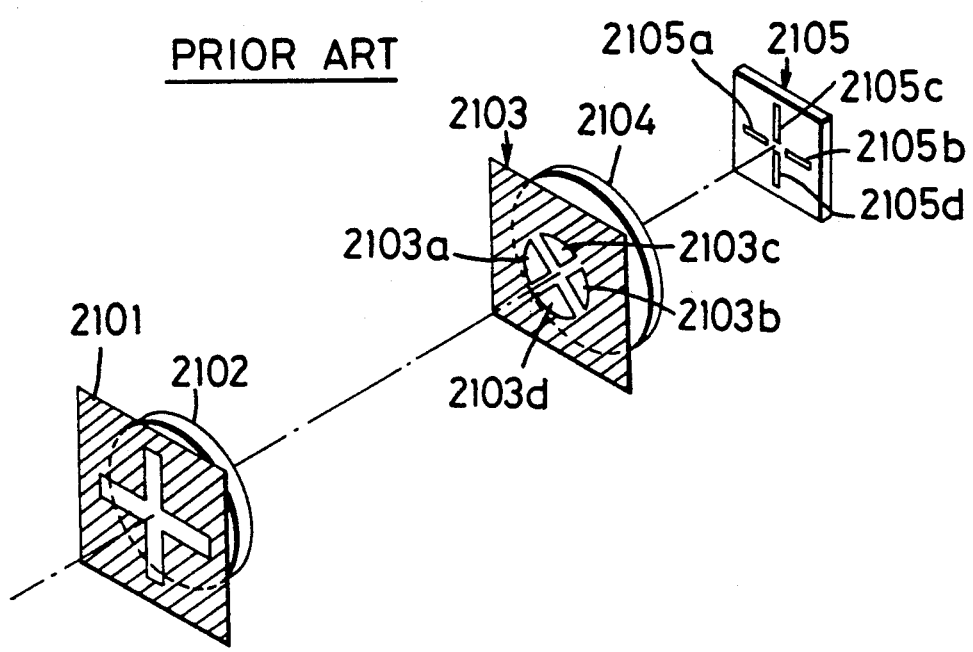
FIG. 1 is a perspective view of a conventional focus state detecting optical system.
Figure 2:
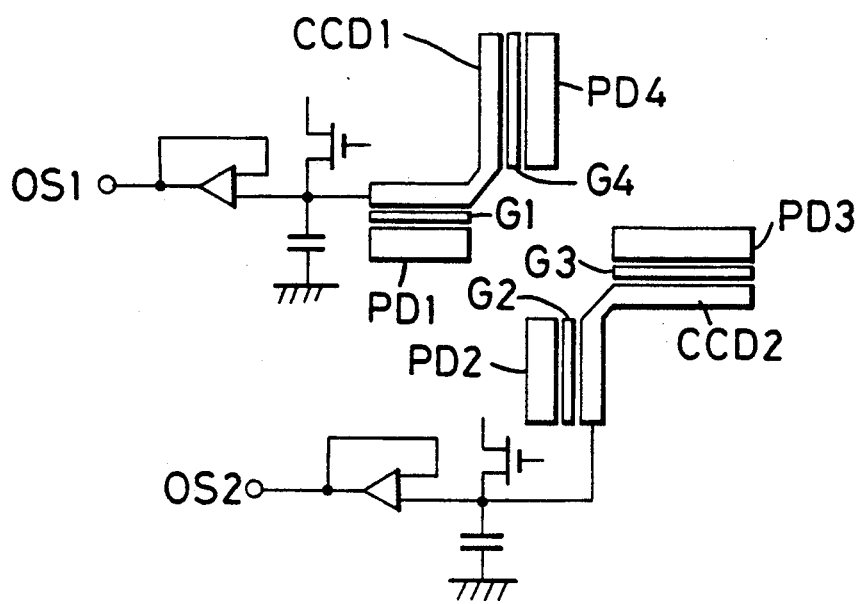
FIG. 2 is a plan view of a structure of a light receiving part of a conventional focus state detecting device.
Figure 3:
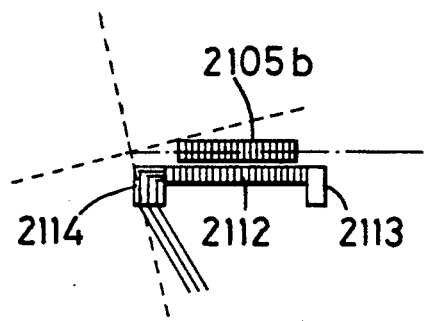
FIGS. 3 and 4 are plan views used in explaining a principle of the present invention.

For transferring the signal charges generated in the photoelectric sensor arrays 2105a, 2105b, 2105c, 2105d shown in FIG. 1, by means of CCD shift registers, the photoelectric sensor array 2105, for example, is positioned substantially parallel to a CCD shift register 2112 as shown in FIG. 3. In such arrangement the CCD shift register has to be slightly longer than the photoelectric sensor array, and has to be provided at one end with an output unit 2113, and at the other end with lead wires 2114. For this reason the phtoelectric sensor arrays cannot be made mutually closer beyond a certain limit. In FIG. 3, each of four areas divided by broken lines is an area to be occupied by a photoelectric sensor array and corresponding circuits.

Figure 5A:
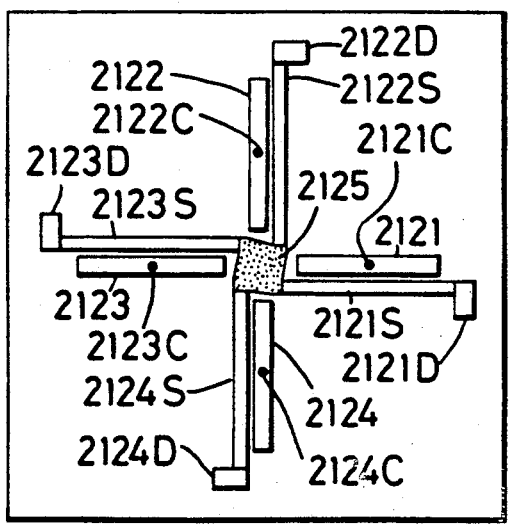
FIGS. 5A and 5B are also plan views used in explaining a principle of the present invention.

FIG. 5A shows a structure in which the structure of FIG. 3 is applied to all the arrays. There are shown arrays 2121, 2122, 2123, 2124 each composed of plural photoelectric sensors; CCD shift registers 2121S, 2122S, 2123S, 2124S; output units 2121D, 2122D, 2123D, 2124D; and lead wires 2125. In this structure the photoelectric sensors cannot be positioned in the vicinity of the central area 2125.

Figure 5B:
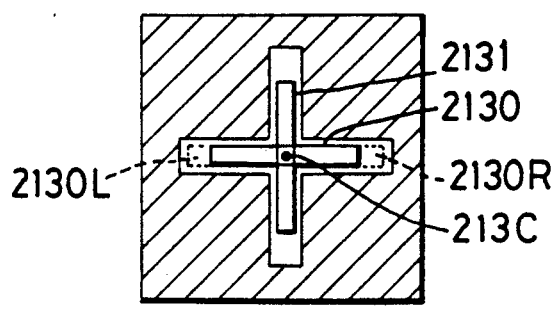

Thus the conventional arrangement of the related circuits leads to a drawback of narrowed area of focus state detection. More specifically, as shown in FIG. 5B, the focus state detecting area on the focus state detecting plane is defined by a solid-lined area with the center at 213C. Thus the left end of the array 2121 in FIG. 5A, with the center at 2121C, is hindered by the area 2125 as indicated by a broken-lined left end 2130L in FIG. 5B, and the right end of the array 2123 in FIG. 5A, with the center ar 2123C, is hindered by the area 2125, as indicated by the broken-lined right end 2130R in FIG. 5B, so that the focus state detecting area is made narrower.

Such narrow focus state detecting area results in a reduction in the maximum detectable image displacement, and the focus state detection becomes unstable in case of a moving object, as it is easily positioned out of the focus state detecting area.

Figure 4:
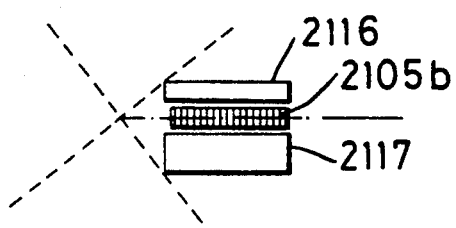

Also, with a device having a different form of charge transfer as shown in FIG. 4, if a circuit 2116 for detecting the output peak of the photoelectric sensors in the array 2105b and a circuit 2117 for storing and transferring the outputs of the photoelectric sensors in the array 2105b are positioned as illustrated, the focus state detecting area is restricted since the crossing point of the broken lines has to be at the center of the photoelectric sensor arrays.

In the following there will be explained the structure of a focus state detecting optical system constituting a first embodiment of the present invention.

Figure 6:
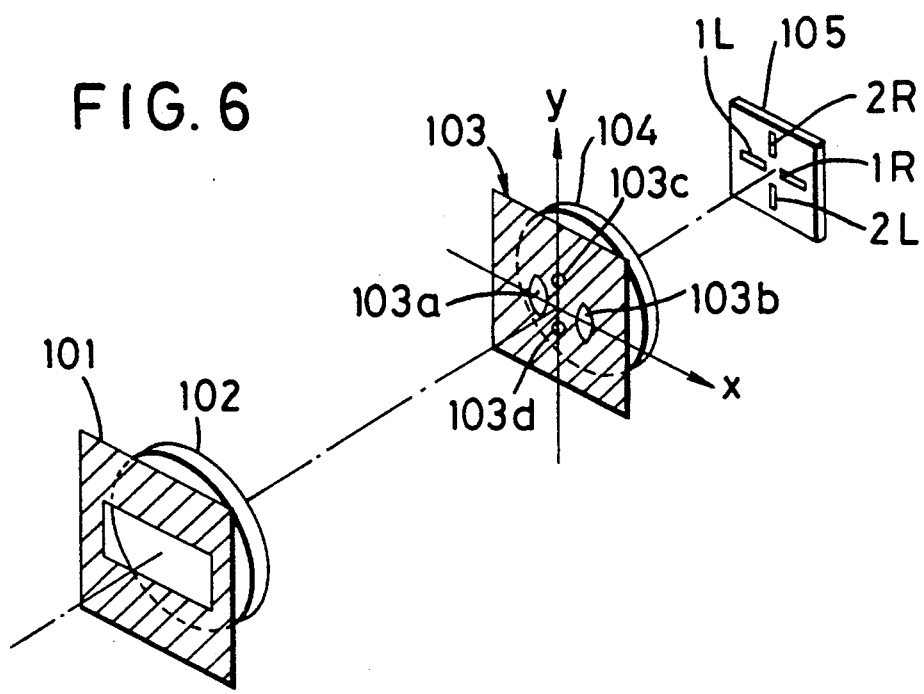
FIG. 6 is a perspective view of a focus state detecting optical system of the present invention.
Figure 7:
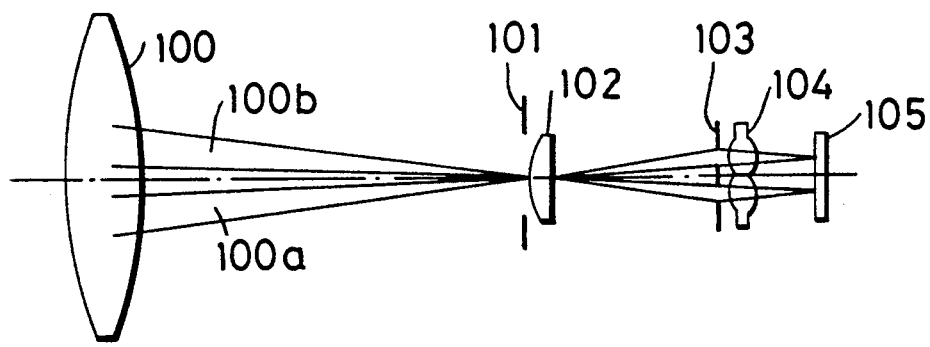
FIG. 7 is a lateral side view of a focus state detecting optical system of the present invention.

As shown in FIGS. 6 and 7, the focus state detecting optical system is composed of a viewing field mask 101 positioned in the vicinity of the focus state detecting plane (primary image plane); a field lens 102; a diaphragm plate 103 having two pairs of apertures; and two pairs of re-imaging lenses 104, thus constituting an optical system for guiding light fluxes that have passed diaphragm apertures 103a, 103b spatially different in a first direction to a pair of photoelectric sensor arrays 1L, 1R; and an optical system for guiding the light fluxes that have passed diaphragm apertures 103c, 103d spatially different in a second direction perpendicular to the first direction, to another pair of photoelectric sensor arrays 2L, 2R. Each photoelectric sensor array is composed of a linear arrangement of plural photoelectric sensors, and the outputs of the sensors are supplied to a microcomputer for effecting focus state detection.

Figure 8A:
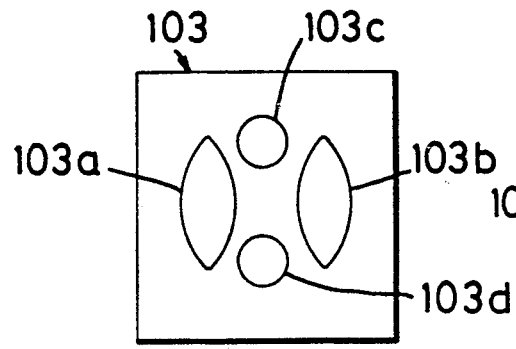
FIGS. 8A and 8B are plan views respectively showing parts of a focus state detecting optical system of the present invention.
Figure 8B:
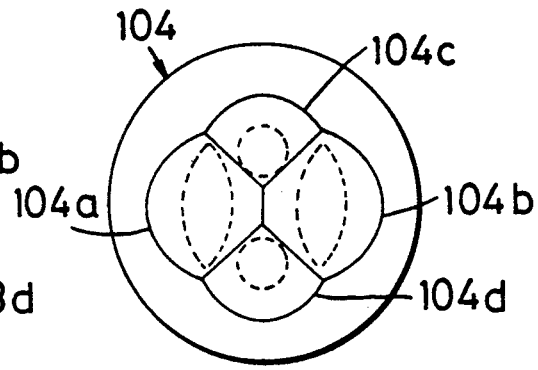

The two pairs of apertures on the diaphragm plate 103 have mutually different areas as shown in FIG. 8A. The apertures 103a, 103b of higher frequency of use in the first direction have sufficiently large areas, while the apertures 103c, 103d of lower frequency of use in the second direction have smaller areas, as they occupy the remining space. More specifically, the apertures 103a, 103b are elongated in a direction perpendicular to the direction of arrangement of the re-imaging lenses 104a, 104b, while the apertures 103c, 103d are circular or elongated in a direction perpendicular to the direction of arrangement of the re-imaging lenses 104c, 104d. Accordingly, as shown in FIG. 8B a pair of re-imaging lenses 104a, 104b arranged in the first direction are made sufficiently large, while the lenses 104c, 104d positioned in the second direction are made smaller. Also the photoelectric sensor arrays 1L, 1R in the first direction are made sufficiently long, while those 2L, 2R in the second direction are made shorter. Consequently the focus state detection in the first direction does not suffer from deterioration of precision at the lower limit of luminosity.

Figure 9A:
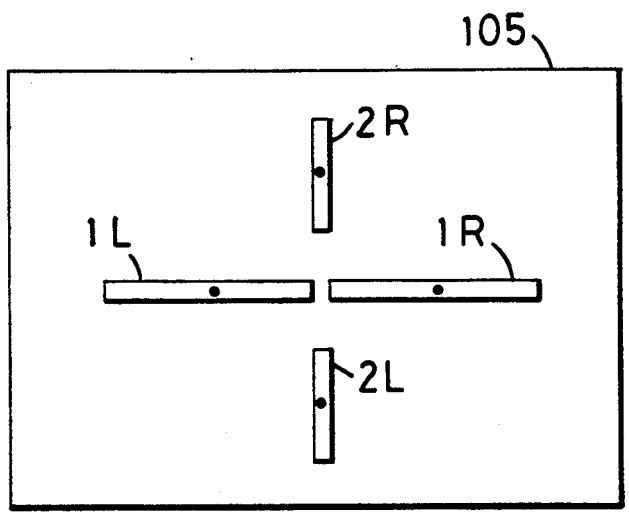
FIG. 9A is a plan view showing the arrangement of photoelectric sensor arrays in a focus state detecting device of the present invention.
Figure 9B:
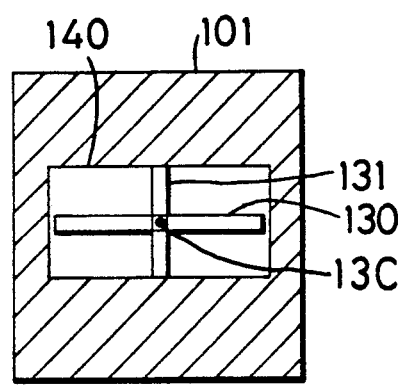
FIGS. 9B and 9C are plan views showing the relationship between photoelectric sensor arrays and a diaphragm of a focus state detecting optical system of the present invention.
Figure 9C:
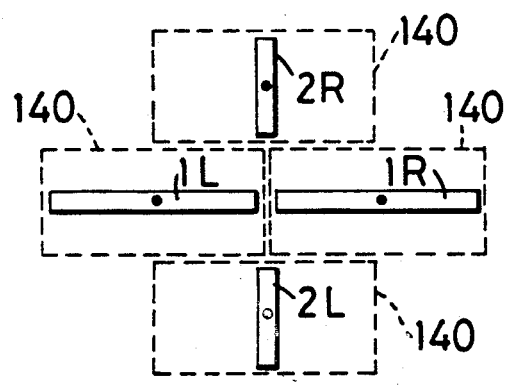

FIG. 9A shows an example of structure of the light receiving unit utilizing CCD image sensors as the photoelectric sensor arrays. FIG. 9B shows the photoelectric sensor arrays viewed, through the optical system, on an aperture 140 on the field mask 101 at the focus state detecting plane (primary image plane). It will be understood that the paired arrays 1L and 1R mutually overlap as represented by 130, and the paired arrays 2L and 2R mutually overlap as represented by 131. Also as shown in FIG. 9C, on the photoelectric sensor arrays, the aperture 140 of the mask 101 is projected without overlapping, as indicated by broken lines, respectively on the arrays 1L, 1R, 2L and 2R.

Figure 10A:
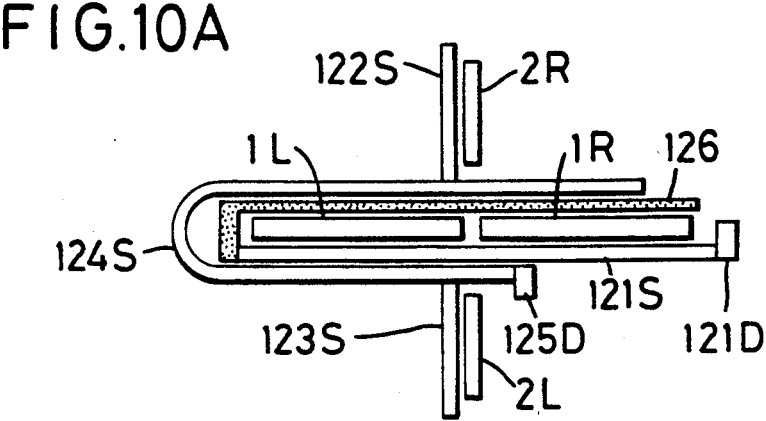
FIGS. 10A, 10B, 10C, 10D and 10E are plan views showing the arrangement of photoelectric sensor arrays and related circuits in a first embodiment of the present invention.

FIG. 10A illustrates a first embodiment of the present invention, in which a pair of photoelectric sensor arrays 1R, 1L are positioned as mutually close as possible in order to maximize the focus state detecting area in the first direction, and the signal charges thereof are released from an output unit 121D, through a single CCD shift register 121S arranged parallel to the arrays 1R, 1L. The lead wire portion 126 for the CCD shift register 121S is also positioned parallel.

In the second direction perpendicular to the first direction, the detecting area is narrower because it utilizes the remaining space. The other pair of photoelectric sensor arrays 2R, 2L is positioned separate from the arrays 1R, 1L. The signal charges are transferred, through vertical shift registers 122S, 123S and another shift register 124S, and released from an output unit 125D.

In the first embodiment, as explained above, the focus state detecting areas are of different sizes in plural directions, and more specifically the arrays 1R, 1L in the first direction are made longer than the other arrays 2R, 2L in the second direction as shown in FIG. 10A, so that the range of identifying the front focus state and the rear focus state can be widened in comparison with the conventional structure in which the focus state detecting areas are substantially same in size in plural directions.

Figure 11A:
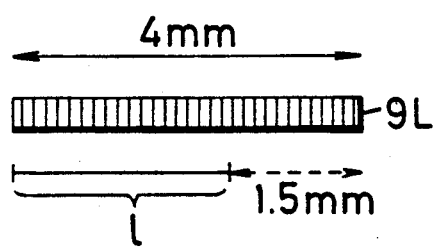
FIGS. 11A, 11B, 12A and 12B are plan views used in explaining a first feature of the present invention.
Figure 11B:
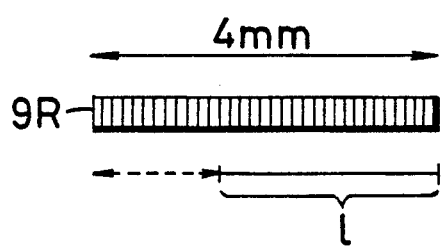
Figure 12A:
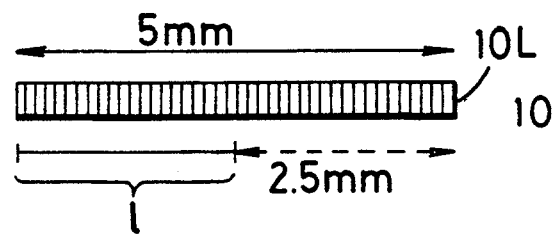
Figure 12B:
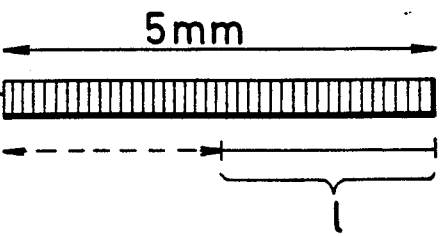

This point will be explained further in relation to FIGS. 11A, 11B, 12A and 12B. In the conventional structure as shown in FIGS. 11A and 11B, the focus state detecting areas are of substantially the same size in the first and second directions, so that the arrays are for example 4 mm long in both directions. On the other hand, in an embodiment of the present invention, the arrays are for example 3 mm long in the first direction and 5 mm long in the second direction, as shown in FIGS. 12A and 12B. In the structure shown in FIGS. 11A and 11B, the image of a given width l in the right field 9R is compared with that of width l in the left field 9L, and the image displacement giving the maximum correlation is determined according to the known method. The image displacement is determined in the same manner in the structure shown in FIGS. 12A and 12B.

In the above-mentioned determination of image displacement, for example with a width l of comparison selected equal to 2.5 mm, the structure of FIGS. 11A and 11B provides a maximum image displacement of 1.5 mm while the structure of FIGS. 12A and 12B provides a maximum displacement of 2.5 mm. If the angle between the principal rays of the light fluxes 100a, 100b shown in FIG. 7 approximately corresponds to F10, the range of detecting the front or rear focus state is about 10 times the maximum image displacement. The detecting range therefore becomes 15 mm in the structure of FIGS. 11A and 11B but 25 mm in the structure of FIGS. 12A and 12B, thus being wider by 10 mm in case of the present embodiment.

Figure 13A:
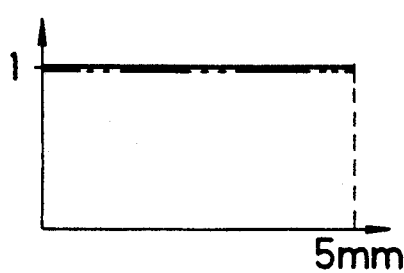
FIGS. 13A, 13B, 13C and 13D are diagrams used in explaining a second feature of the present invention.
Figure 13C:
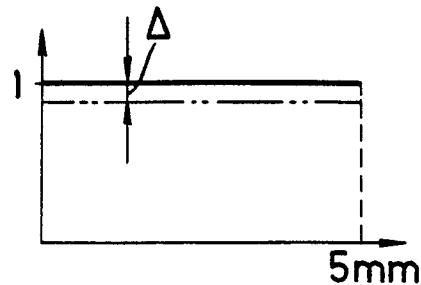
Figure 13B:
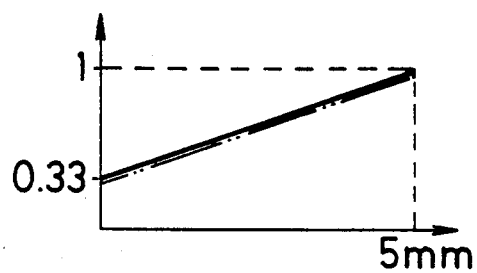
Figure 13D:
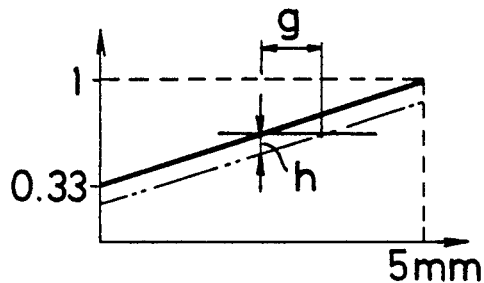

Also in the present embodiment, the paired photoelectric sensor arrays have a common output unit, so that any object can be precisely detected without the trouble of imbalance in the output signals, as will be explained in the following in reference to FIGS. 13A, 13B and 13C. FIG. 13A shows the outputs of paired photoelectric sensor arrays, respectively by a solid line and a broken line, in case of uniform illumination. If an object having uniform density slope is viewed under such balanced state, there are obtained outputs as shown in FIG. 13B in case of correct focusing, so that exact focus state detection can be achieved. However if the outputs of paired photoelectric sensor arrays are obtained through separate output amplifiers, an error $\Delta$ of 1 to 3% is unavoidable as shown in FIG. 13C, due to a slight difference in the gain or in the offset. When the above-mentioned object with a uniform density slope is viewed in such slightly unbalanced state, the two images do not coincide as shown in FIG. 13D, even in case of exact focusing. This corresponds to an image displacement of g, constituting an error in the focus state detection. For example in case of an error $\Delta$ of 2% with arrays of 5 mm in length in case of FIG. 13D;

$$g = 5/(1-0.33) \times (1-0.33) \times 0.02 = 0.1 \ (mm)$$

so that the amount of defocus is as large as 1 mm if the angle of the principal rays shown in FIG. 7 corresponds to F10.

Figure 10B:
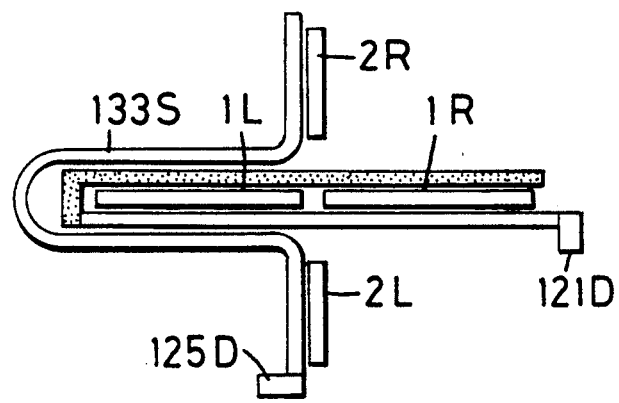

FIG. 10B shows a first variation of the first embodiment, in which the shift register 133S for the second direction is constructed as a U-shaped single unit detouring around the photoelectric sensor arrays 1L, 1R in the first direction, and is connected to a common output unit 125D, thus realizing a simpler structure.

Figure 10C:
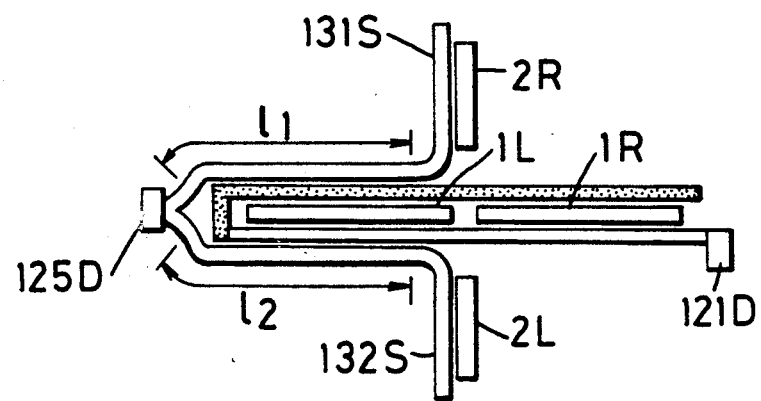

FIG. 10C shows a second variation of the first embodiment, in which the shift registers 131S, 132S for the second direction are positioned along the photoelectric sensor array 1L in the first direction and are connected to a common output unit 125D. In this case the shift registers 131S and 132S are so constructed as to alternately release the outputs of the arrays 2R and 2L. Such alternate output from the arrays 2L and 2R may be advantageous in the data processing in the hardware. For example U.S. Pat. No. 4,564,919 discloses a structure in which the shift registers are so constructed that the signal charges of plural photoelectric sensors in one of two photoelectric sensor arrays and those of the other array are alternately read, and the second variation of the first embodiment of the present invention is applicable to such structure. The above-mentioned U.S. Patent further discloses an art of effecting focus state detection at any time during the reading of the output charges, so that, when applied to the second variation of the first embodiment of the present invention, the period from the release of the signal charges from the arrays of the second direction to the completion of focus state detection can be shortened, as the number of pixels of the arrays in the second direction is smaller.

Figure 10D:
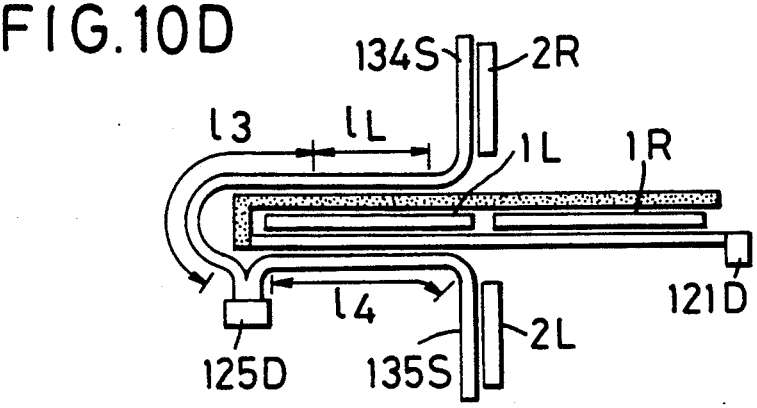

FIG. 10D shows a third variation of the first embodiment, in which the shift registers 134S, 135S for the second direction are positioned around the photoelectric sensor arrays 1L, of the first direction and are connected to a common output unit 125D, with a difference $l_L$ in the length so that the signal of the array 2L precedes that of the array 2R even when both shift registers 134S, 135S are simultaneously driven. Thus the outputs of the arrays 2R, 2L do not appear at the output unit 125D at the same time.

Figure 10E:
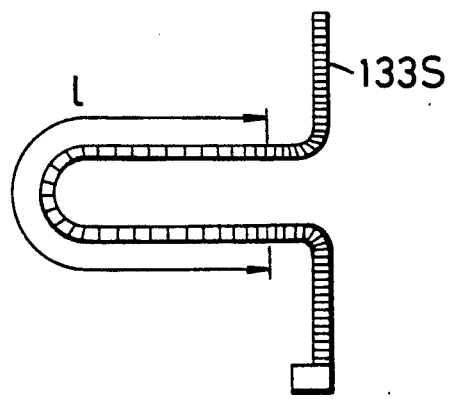

FIG. 10E shows a variation of the CCD shift register 133S shown in FIG. 10B. The portion of the shift register 133S going around the array 1L is redundant and extends the transfer time unnecessarily. As shown in FIG. 10E, in a detour portion l of the shift register 133S, the pitch of transfer is made larger to reduce the transfer time.

A similar variation is also possible in the structures shown in FIGS. 10C and 10D, wherein the pitch of transfer in the portions $l_1, l_2, l_3, l_4$ can be made larger to reduce the transfer time.

The foregoing first embodiment is provided with a first output unit for the photoelectric sensor arrays 1R, 1L for the first direction and a separate second output unit for the arrays 2R, 2L for the second direction, and is advantageous for independent control of the arrays in two directions, but requires a complex operation in case of control with a CPU. More specifically there is required complicated control on the timing of start and termination of the charge accumulation in the arrays 1R, 1L in the first direction and in the arrays 2R, 2L in the second direction, and the control is unable to respond if either pair of arrays completes the charge accumulation and initiates charge transfer during the A/D conversion and storage in the memory of the output signals from the other pair of arrays. These drawbacks are resolved in a second embodiment to be explained in the following.

Figure 10F:
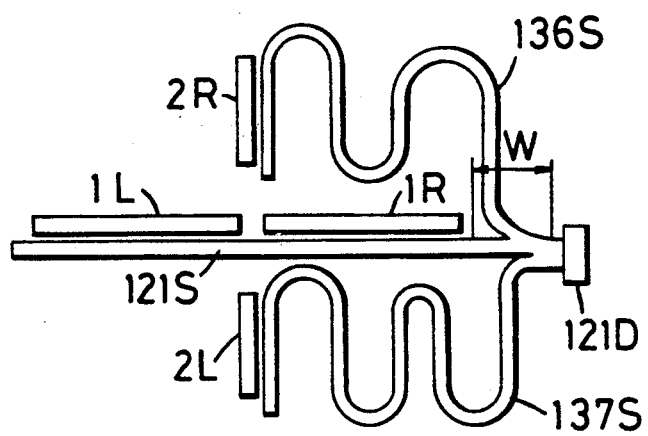
FIGS. 10F, 10G and 10H are plan views showing different arrangement of photoelectric sensor arrays and related circuits in a second embodiment of the present invention.

FIG. 10F shows a second embodiment of the present invention, in which the charge accumulation is started and completed simultaneously in the sensors 1R, 1L and in those 2R, 2L, and the lengths of shift registers 121S, 136S, 137S are suitably selected so that the outputs of the arrays 1R, 1L, 2R, 2L do not mutually overlap nor have unnecessary interval therebetween.

More specifically, the shift registers 121S, 136S and 137S are joined together in front of a common output unit 121D, and the length of the shift register 136S is so selected that the output of the array 1L is immediately followed by that of the array 2R, while the length of the shift register 137S is such that the output of the array 1R is immediately followed by that of the array 2L.

However, in the structure shown in FIG. 10F, since all the shift registers are joined to the common output unit 121D, there is required a large length W in the joined portion, thus deteriorating the response from the start of signal transfer to the release of the output signals of the array 1R.

Figure 10G:
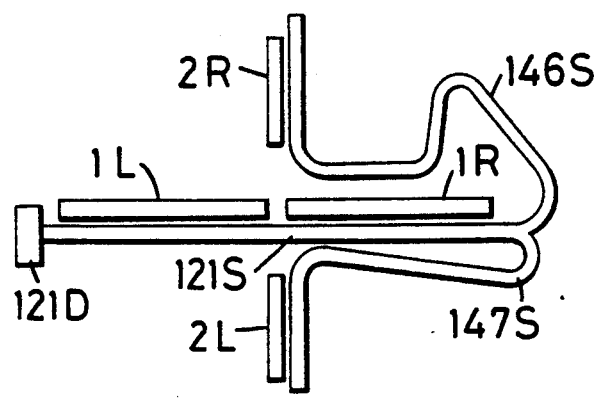

This drawback is resolved in a structure shown in FIG. 10G, in which the output unit 121D is connected to an end of the shift register 121S, of which the other end is connected to shift registers 146S, 147S for the arrays 2L, 2R, and the shift register 146S is made longer than 147S so that the outputs 2L, 2R do not mutually overlap in time. In this case there is a slight interval after the release of the output of 1R and before the release of the output of 2L. However the CPU starts processing after the completion of the outputs of 1L and 1R, and executes an interruption procedure when the transfer of the outputs of 2L, 2R is started in the course of the processing, so that the total processing time is not too much different in comparison with the case of continuous release of the outputs of 1L, 1R, 2L and 2R.

In the structures shown in FIGS. 10F and 10G, since all the shift registers are joined to the common output unit 121D, the sum of dark currents generated in the shift registers may increase, eventually deteriorating the S/N ratio.

Figure 10H:
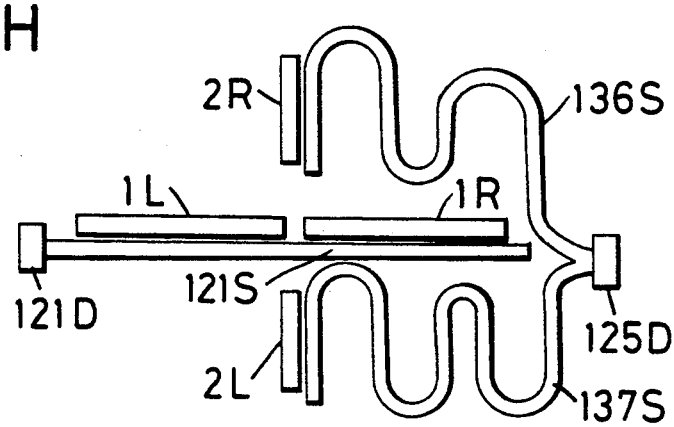

FIG. 10H shows a second variation of the second embodiment, in which the output unit 121D for the shift register 121S for the arrays 1R, 1L is separated from the output unit 125D for the shift registers 136S, 137S for the arrays 2R, 2L, whereby increase in the sum of dark currents is avoided.

Naturally the end of charge accumulation in the arrays 1R, 1L is selected so as to occur at the same time as that in the arrays 2R, 2L, and the lengths of the shift registers 121S, 136S, 137S are so suitably selected that the outputs of the arrays 1R, 1L, 2R, 2L do not mutually overlap and are without unnecessary interval therebetween.

The separate formation of the output units 121D and 125D means the presence of separate output capacitances for converting the charge transferred by the shift registers into voltage. In the following there will be explained, with reference to FIG. 14, a structure having separate output capacitances for converting the charges into voltage output signals but having a united output terminal from the CCD chips.

Figure 14:
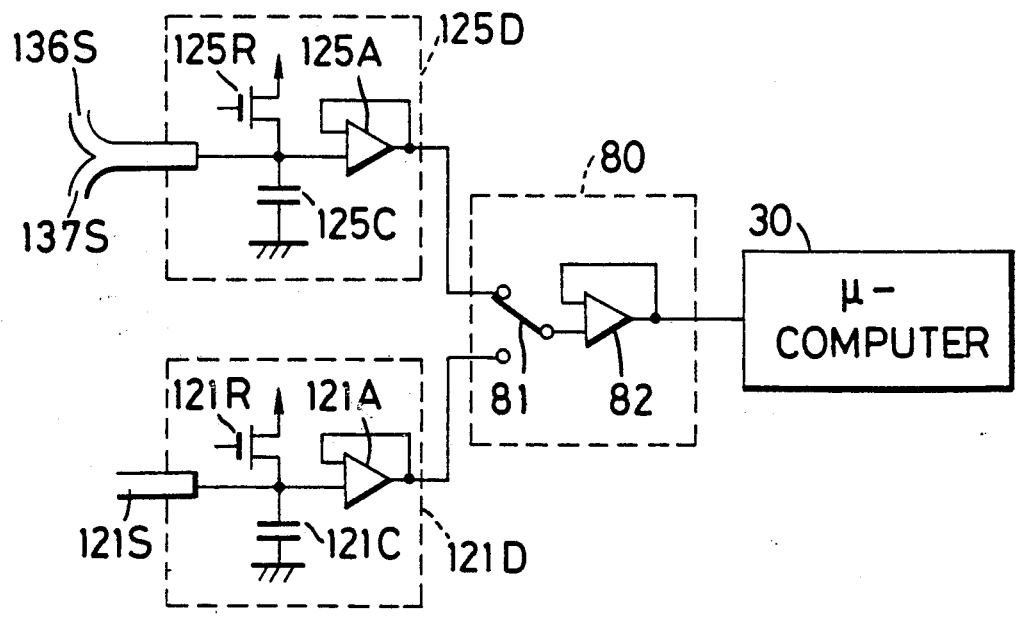
FIG. 14 is a circuit diagram showing part of a circuit in a variation of the second embodiment of the present invention.

In FIG. 14, broken-lined blocks 121D, 125D are respectively connected to the shift register 121S and the shift registers 136S, 137S shown in FIG. 10H. The charges transferred by the shift registers are respectively converted by output capacitances 121C, 125C into voltages, which are released through buffer amplifiers 121A, 125A. Transistors 121R, 125R are provided for resetting the output prior to each charge transfer.

The outputs of the arrays 1R, 1L and those of arrays 2R, 2L after conversion into voltages are combined by output synthesizing means in a broken-lined block 80, consisting of a switch 81 and a buffer amplifier 82 whereby the number of output terminals from the CCD chip 105 can be reduced. The output of the buffer amplifier 82 is supplied to a microcomputer 30 for detecting the focus state.

Figure 15:
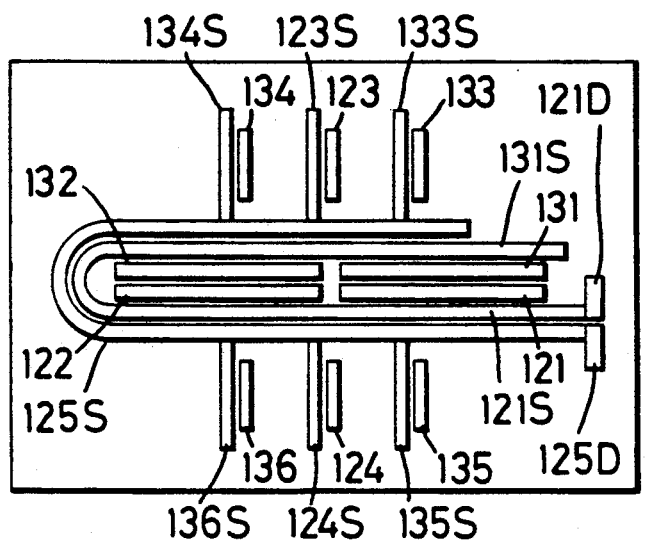
FIGS. 15 and 16 are plan views of a third embodiment.
Figure 16:
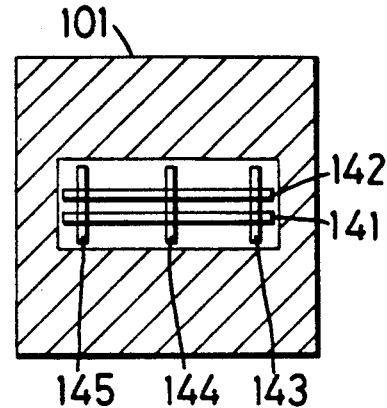

FIGS. 15 and 16 illustrate a third embodiment of the present invention.

This embodiment utilizes the structure of the first embodiment in which the signal charges for the second direction are transferred by horizontal and vertical registers. As shown in FIG. 15 there are provided plural pairs of photoelectric sensor arrays 133, 135; 123, 124; and 134, 136 in the second direction; plural pairs of vertical shift registers 133S, 135S; 123S, 124S and 134S, 136S positioned along the sensor arrays; and a horizontal register 125S for guiding the charges to an output unit 125D, whereby the focus state detection is made possible in plural areas.

In FIG. 15 there are further provided plural pairs of photoelectric sensor arrays 121, 122; and 131, 132 in the first direction; and shift registers 121S, 131S in U-shaped patterns to surround the above-mentioned plural pairs of the photoelectric sensor arrays, whereby the photoelectric signals are guided to a common output unit 121D thereby enabling focus state detection in plural areas.

FIG. 16 is similar to FIG. 9B, showing the relationship between the aperture of the mask 101, and the detecting areas 141, 142 in the first direction and the detecting areas 143, 144, 145 in the second direction. It will be understood that, on the focus state detecting plane, the arrays 121, 122 mutually overlap in the detecting area 141; the arrays 131, 132 mutually overlap in the detecting area 142, the arrays 133, 135 mutually overlap in the detecting area 143, the arrays 123, 124 mutually overlap in the detecting area 144, and the arrays 134, 136 mutually overlap in the detecting area 145.

Now reference is made to FIGS. 17A, 17B, 18A and 18B for explaining other advantages obtained in varying the lengths of the focus state detecting areas in plural directions.

Figure 17A:
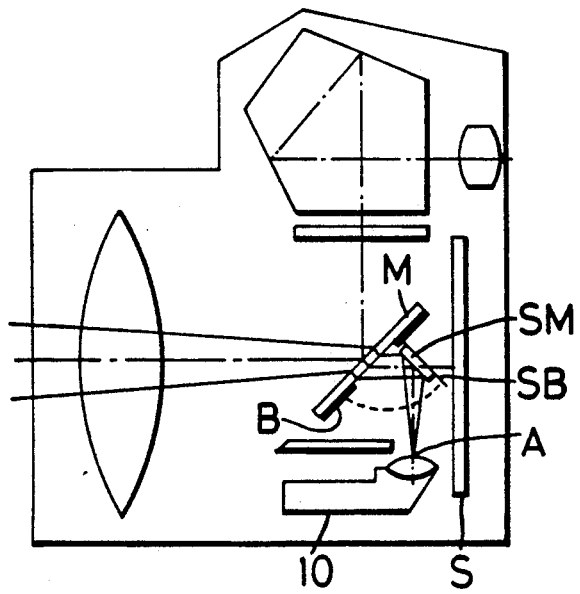
FIG. 17A is a schematic view of a focus state detecting device of of the present invention, applied to a single lens reflex camera.
Figure 17B:
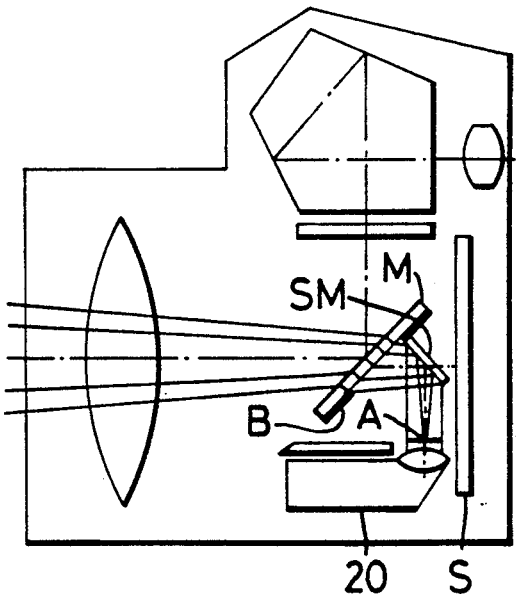
FIG. 17B is a schematic view of a conventional focus state detecting device applied to a single lens reflex camera.
Figure 18A:
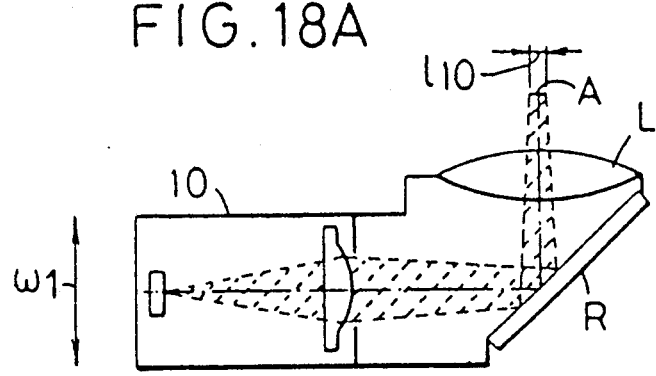
FIG. 18A is a lateral side view showing part of the focus state detecting device shown in FIG. 17A.
Figure 18B:
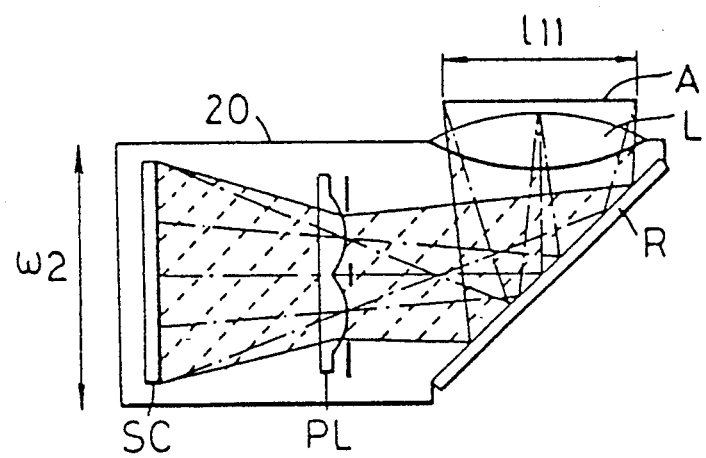
FIG. 18B is a lateral side view showing part of the focus state detecting device shown in FIG. 17B.

FIGS. 17A and 18A show a camera body incorporating a focus state 10 of the invention detecting device, while FIGS. 17B and 18B show, for comparison, a camera body incorporating the focus state detecting device 20 described in the Japanese Laid-open Patent 62-173413. There are shown a main mirror M with a half translucent area at the center, a sub mirror SM for deflecting the light path down toward a field lens L of the focus state detecting device; and a shutter block S. It is assumed that the first direction referred to earlier is perpendicular to the plane of the drawing, while the second direction is parallel thereto.

In the structure of the invention, shown in FIG. 18A, the image of the photoelectric sensor array has a size of about 4 mm in the first direction perpendicular to the plane of the drawing, on the focus state detecting plane A, but, in the direction along the plane of the drawing, has a size of about 1 mm ($l_{10}$) Consequently, even including the spreading of the detecting light flux, the width of the light flux in the direction along the plane of the drawing is 3-4 mm at the position of the sub mirror, so that the sub mirror can be made smaller and does not collide with the shutter block S. Also when the main mirror and the sub mirror are shifted upwards, the stray light from the finder can be completely shielded by the sub mirror SM and a shield member SB therebehind, since the central half-transparent area of the main mirror is small compared to the opaque area B thereof, as shown in FIG. 17A.

On the other hand, in the structure shown in FIG. 18B for detecting displacements of plural images, the focus state detecting areas contain the images of the photoelectric sensor arrays on the focus state detecting plane A in the second direction parallel to the plane of the drawing, and the range $l_{11}$ of the images, if as large as 4 mm or larger, will correspond to a width of the 7-8 mm in the direction of the plane of drawing, including the spreading of the light flux, at the position of the sub mirror SM. Thus the sub mirror becomes larger in size and collides with the main mirror. Also the semi-transparent area of the main mirror M becomes larger, so that the stray light from the finder, when the main mirror and the sub mirror are rotated upwards, cannot be shielded by the sub mirror SM alone (shield member SB collides with the shutter block S). There is thus required a complex mechanism for such light shielding.

Also if the image of the photoelectric sensor arrays is made longer in the second direction on the detecting plane A, the width $w_2$ of the mirror R, re-imaging lens PL and sensor chip SC in the direction of the plane of the drawing becomes larger, as shown in FIG. 18B, thus resulting in a drawback of a lowered camera bottom and a larger camera body.

In this manner the use of photoelectric sensor arrays of the same length in the first and second directions gives rise to various drawbacks in the construction of the camera.

Figure 19:
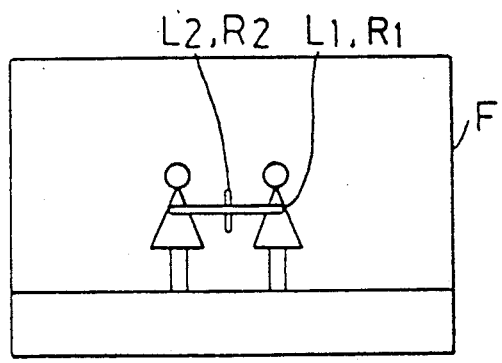
FIG. 19 is a diagram showing the arrangement of photoelectric sensor arrays of the invention when images thereof are projected in the viewing field of the finder.

FIG. 19 shows the arrangement of the photoelectric sensor arrays when the images thereof are projected in the photographing field of the camera, or in the viewing field of the finder F. The focus state cannot be detected with the conventional focus state detecting device in case, as shown in FIG. 19, two persons are not positioned at the center of the viewing field of the finder F, but the focus state detecting device of the present invention is capable of focus state detection, since the photoelectric sensor arrays L1, B1, widened in the first direction (wider than L2, R2 in the second direction), can cover such objects at the end portions thereof.

When detecting the image displacement in plural directions, it is practically preferable not to elongate the detecting area (photoelectric sensor arrays) in the second direction. It is practically preferable to limit the detecting area to a range of 4 to 3 mm in the second direction and to extend the detecting area in the first direction, as in the present invention. Use of such limited detecting area in the second direction and of extended detecting area in the first direction is also effective in the actual construction of the camera.

What is claimed is:

1. A focus state detecting device for a camera, comprising:
  a) a pair of first photoelectric converting array means, each extended in a first direction and each containing plural photoelectric converting elements, said pair of first photoelectric converting array means being arranged along said first direction;
  b) a pair of second photoelectric converting array means, each extended in a second direction crossing said first direction and each containing plural photoelectric converting elements, said pair of second photoelectric converting array means being arranged along said second direction; wherein the length of each of said paired first photoelectric converting array means in the first direction is selected larger than that of each of said paired second photoelectric converting array means in said second direction;
  c) an optical system for guiding the light fluxes from two different areas in the exit pupil of a photographing lens of the camera to said pair of first photoelectric converting array means, and guiding the light fluxes from two other different areas of the exit pupil of the photographing lens of the camera to said pair of second photoelectric converting array means;
  d) a first output circuit having a first output terminal;
  e) a second output circuit having a second output terminal;
  f) a shift register for transferring the outputs of said paired first photoelectric converting array means to said first output circuit, said shift register being so constructed that at least a part thereof are adjacent to said paired first photoelectric converting means and that the outputs of one of said paired first photoelectric converting array means is transferred to said first outputs circuit after the output of the other of said paired first photoelectric converting array means is transferred to said first output circuit, whereby said first output circuit releases, from said first output terminal, signals corresponding to the outputs from said shift register;
  g) transfer means for transferring the outputs of said paired second photoelectric converting array means to said second output circuit in such a manner that the outputs of one of said paired second photoelectric converting array means are transferred to said second output circuit after the outputs of the other of said paired second photoelectric converting array means are transferred to said second output circuit, whereby said second output circuit releases, from said second output terminal, signals corresponding to the outputs from said transfer means; and
  h) operation means for effecting a focus state detecting operation according to the signals from said first and second output terminals.

2. A focus state detecting device for a camera, comprising:
  a) a pair of first photoelectric converting array means, each extended in a first direction and each composed of plural photoelectric converting elements, said pair of first photoelectric converting array means being arranged along said first direction;
  b) a pair of second photoelectric converting array means, each extended in a second direction crossing said first direction and each composed of plural photoelectric converting elements, said pair of second photoelectric converting array means being arranged along said second direction; wherein the length of each of said paired first photoelectric converting array means in the first direction is selected larger than that of each of said paired second photoelectric converting array means in said second direction;

c) an optical system for guiding the light fluxes from two different areas in the exit pupil of a photographing lens of the camera to said pair of first photoelectric converting array means, and guiding the light fluxes from two other different areas of the exit pupil of the photographing lens of the camera to said pair of second photoelectric converting array means;

d) a first output unit having a first output terminal;

e) a second output unit having a second output terminal;

f) first transfer means for transferring the outputs of said paired first photoelectric converting array means to said first output unit, which thereby releases, from said first output terminal, signals corresponding to the outputs from said first transfer means;

g) second transfer means for transferring the outputs of said paired second photoelectric converting array means to said second output unit, which thereby releases, from said second output terminals, signals corresponding to the outputs from said second transfer means; and h) operation means for effecting focus state detection according to the signals from said first and second output terminals.

3. A focus state detecting device according to claim 2, wherein said first transfer means is so constructed that the outputs of one of said paired first photoelectric converting array means are transferred to said first output unit after those of the other of said paired first photoelectric converting array means are transferred to said first output unit.

4. A focus state detecting device according to claim 3, wherein said first transfer means comprises a shift register extended along said first direction, said shift register being so positioned that at least a part thereof is adjacent to said paired first photoelectric converting array means and being adapted to transfer the outputs from said paired first photoelectric converting array means to said first output unit.

5. A focus state detecting device according to claim 3, wherein said second transfer means is so constructed that the outputs of one of said paired second photoelectric converting array means are transferred to said second output unit after those of the other of said paired second photoelectric converting array means are transferred to said second output unit.

6. A focus state detecting device according to claim 5, wherein said second transfer means comprises a shift register, which is so positioned that at least a part thereof is adjacent to one of said paired second photoelectric converting array means and that at least a part of the remainder thereof is adjacent to the other of said paired second photoelectric converting array means, whereby the outputs from said paired second photoelectric converting array means are transferred to said second output unit.

7. A focus state detecting device according to claim 5, wherein said second transfer means comprises two shift registers, which are so positioned that at least a part of one of said two shift registers is adjacent to one of said paired second photoelectric converting array means and that at least a part of the other of said two shift registers is adjacent to the other of said paired second photoelectric converting array means, whereby said two shift registers transfer the outputs from said paired second photoelectric converting array means to said second output unit.

8. A focus state detecting device according to claim 2, wherein said first and second output units respectively have amplifying circuits.

9. A focus state detecting device for a camera, comprising:

a) a pair of first photoelectric converting array means, each extended in a first direction and each composed of photoelectric converting elements;

b) a pair of second photoelectric converting array means, each extended in a second direction crossing said first direction and each composed of plural photoelectric converting elements; wherein the length of each of said paired first photoelectric converting array means in the first direction is selected larger than that of each of said paired second photoelectric converting array means in said second direction;

c) an optical system for guiding the light fluxes from two different areas in the exit pupil of a photographing lens of the camera to said pair of first photoelectric converting array means, and guiding the light fluxes from two other different areas of the exit pupil of the photographing lens of the camera to said pair of second photoelectric converting array means; and d) operation means for effecting focus state detection according to the outputs of said paired first photoelectric converting array means and the outputs of said paired second photoelectric converting array means.

10. A focus state detecting device according to claim 9, wherein said pair of first photoelectric converting array means is arranged along said first direction, and said pair of second photoelectric converting array means is arranged along said second direction.

11. A focus state detecting device according to claim 10, wherein said pair of first photoelectric converting array means is arranged substantially along the longitudinal direction of the photographing field of said camera.

12. A focus state detecting device according to claim 11, wherein said first direction is substantially perpendicular to said second direction.

13. A focus state detecting device for a camera, comprising:

a) a pair of first photoelectric converting array means, each extended in a first direction and each containing plural photoelectric converting elements, said pair of first photoelectric converting array means being aligned along said first direction;

b) a pair of second photoelectric converting array means, each extended in a second direction crossing said first direction and each containing plural photoelectric converting elements, said pair of second photoelectric converting array means being aligned along said second direction;

c) a terminal connected to both said pair of first photoelectric converting array means and said pair of second photoelectric converting array means; and d) operation means for effecting focus detecting operation according to an output from said terminal.

14. A focus state detecting device according to claim 13, which further comprises means for transferring the outputs of said paired first and said second photoelectric converting array means through said terminal to said operation means.

15. A focus state detecting device according to claim 14, wherein the length of each of said paired first photoelectric converting array means in said first direction is selected larger than that of each of said paired second photoelectric converting array means in said second direction.

16. A focus state detecting device according to claim 15, wherein said transferring means transfers the outputs of said paired first photoelectric converting array means before transferring the outputs of said paired second photoelectric converting array means.

17. A focus state detecting device for a camera, comprising:

a) a first group constituted by a plurality of first photoelectric converting array means, each extended in a first direction and each containing plural photoelectric converting elements, said plurality of first photoelectric converting array means being aligned along said first direction;

b) a second group constituted by a plurality of second photoelectric converting array means, each extended in a second direction crossing said first direction and each containing plural photoelectric converting elements, said plurality of second photoelectric converting array means being aligned along said second direction; and c) an optical system for guiding light fluxes from the exit pupil of a photographing lens of the camera to said first and said second groups;

d) said first group comprising a plurality of pairs of photoelectric converting array means and detecting light intensity distribution on a plurality of first detection areas on a predetermined plane between said photographing lens and said optical system, said second group detecting light intensity distribution on a second detection area on said predetermined plane, said plurality of first detection areas crossing said second detection area but not each other.

18. A focus state detecting device according to claim 17, wherein said optical system has a first pair of lenses for guiding light fluxes from two different areas in the exit pupil of the photographing lens of the camera to said first group, and having a second pair of lenses for guiding the light fluxes from two other different areas in the exit pupil of the photographing lens to said second group.

19. A focus state detecting device for a camera, comprising:

a) a first group constituted by a plurality of first photoelectric converting array means, each extended in a first direction and each containing plurality photoelectric converting elements, said plurality of first photoelectric converting array means being aligned along said first direction;

b) a second group constituted by a plurality of second photoelectric converting array means, each extended in a second direction crossing said first direction and each containing plural photoelectric converting elements, said plurality of second photoelectric converting array means being aligned along said second direction; and c) an optical system having a first pair of lenses for guiding light fluxes from two different areas in the exit pupil of a photographing lens of the camera to said first group, and having a second pair of lenses for guiding light fluxes from two other different areas in the exit pupil of the photographing lens to said second group;

d) at least one of said first and said second groups comprising plural pairs of photoelectric converting array means.

20. A focus state detecting device for a camera, comprising:

a) a pair of first photoelectric converting array means, each extended in a first direction and each containing plural photoelectric converting elements, said pair of first photoelectric converting array means being aligned along said first direction;

b) a pair of second photoelectric converting array means, each extended in a second direction crossing said first direction and each containing plural photoelectric converting elements, said pair of second photoelectric converting array means being aligned along said second direction, the length of each of said paired first photoelectric converting array means in said first direction being selected larger than that of each of said paired second photoelectric converting array means in said second direction; and c) an optical system having a first pair of lenses for guiding light fluxes from two different areas in the exit pupil of a photographing lens of the camera to said pair of first photoelectric converting array means, and having a second pair of lenses for guiding light fluxes from two other different areas in the exit pupil of said photographing lens to said pair of second photoelectric converting array means, the aperture of each of said first pair of lenses being larger than that of each of said second pair of lenses.

* * * * *